EMBOSSING MACHINE HAVING TAPE DRIVE ROLL ENGAGEMENT RESPONSIVE TO TAPE MAGAZINE

Filed March 1, 1965 5 Sheets-Sheet 1

INVENTOR.
GEORG FRITZ BREMER
BY
Samuelson & Jacob
ATTORNEYS

June 14, 1966 G. F. BREMER 3,255,860

EMBOSSING MACHINE HAVING TAPE DRIVE ROLL ENGAGEMENT RESPONSIVE TO TAPE MAGAZINE

Filed March 1, 1965 5 Sheets-Sheet 2

INVENTOR.
GEORG FRITZ BREMER
BY
Samuelson & Jacob
ATTORNEYS

INVENTOR.
GEORG FRITZ BREMER
BY
Samuelson & Jacob
ATTORNEYS

INVENTOR.
GEORG FRITZ BREMER
BY
Samuelson & Jacob
ATTORNEYS

INVENTOR.
GEORG FRITZ BREMER
BY
Samuelson & Jacob
ATTORNEYS

United States Patent Office 3,255,860

Patented June 14, 1966

3,255,860
EMBOSSING MACHINE HAVING TAPE DRIVE ROLL ENGAGEMENT RESPONSIVE TO TAPE MAGAZINE

Georg Fritz Bremer, Albany, Calif., assignor to Dymo Industries, Inc., Emeryville, Calif., a corporation of California Filed Mar. 1, 1965, Ser. No. 436,051
8 Claims. (Cl. 197—6.7)

The present invention relates generally to machines for establishing selected embossments on a strip of embossable material, and pertains, more specifically, to an embossing machine in which the embossable material is supplied from a magazine which may be selectively attached or detached from the housing of the machine.

Machines of the type described above which make use of embossable material in the form of an elongated strip have found wide acceptance in the fabrication of embossed displays such as labels, signs, plates, tags, and the like. It has been found convenient to supply the strip material to such machines in magazines which can be simply affixed to the housing of the machine and which can be detached whenever desired. Such machines are provided with embossing means for establishing the desired embossment, and a feed means for delivering the strip material from the supply to the embossing means as well as providing for indexing of the strip in embossing operations. A desirable feature in a machine employing a magazine supply is some provision for enabling free passage of the strip material through the feed means to the embossing means as the magazine is being attached to or detached from the housing of the machine. Additionally, an interlock between magazine and machine is helpful in assuring that the machine cannot begin to operate properly unless the magazine is correctly secured in place.

It is an object of the invention to provide an embossing machine wherein embossable material is ordinarily fed to an embossing means from a magazine supply and the means for feeding the strip will either grip or release the strip in response to the presence or absence, respectively, of a magazine in proper position in the machine.

Another object of the invention is to provide feed means in an embossing machine employing a magazine supply of strip material which feed means is comprised of a pair of rolls at least one of which is movable toward and away from the other in response to the presence and absence of a magazine to allow gripping of the strip between the rolls only when a magazine is properly located in the machine.

A further object of the invention is to provide an embossing machine employing a magazine supply of embossable material and having simple and effective means for assuring that the magazine supply is properly located in the machine before embossing operations can be commenced.

The invention may be described briefly as an embossing machine including a housing with embossing means carried by the housing for establishing embossments on a strip of embossable material. The housing further includes means for receiving a magazine containing a supply of the embossable material and for maintaining the magazine in such cooperative relationship with the housing as to allow the material to be fed from the supply to the embossing means. Feed means are carried by the housing for gripping and feeding the strip from the supply to the embossing means. Means responsive to the absence of a magazine from the magazine receiving means are provided for allowing the strip to be passed through the feed means without gripping of the strip by the feed means in the absence of a magazine and responsive to the presence of a magazine in position in the magazine receiving means for enabling the strip to be gripped and fed by the feed means.

The invention will be more fully understood and further objects and advantages thereof will become apparent in the following detailed description of an embodiment of the invention illustrated in the accompanying drawings, in which:

FIGURE 6 is a bottom plan view of a portion of the machine showing further internal details.

Figures 1, 2:
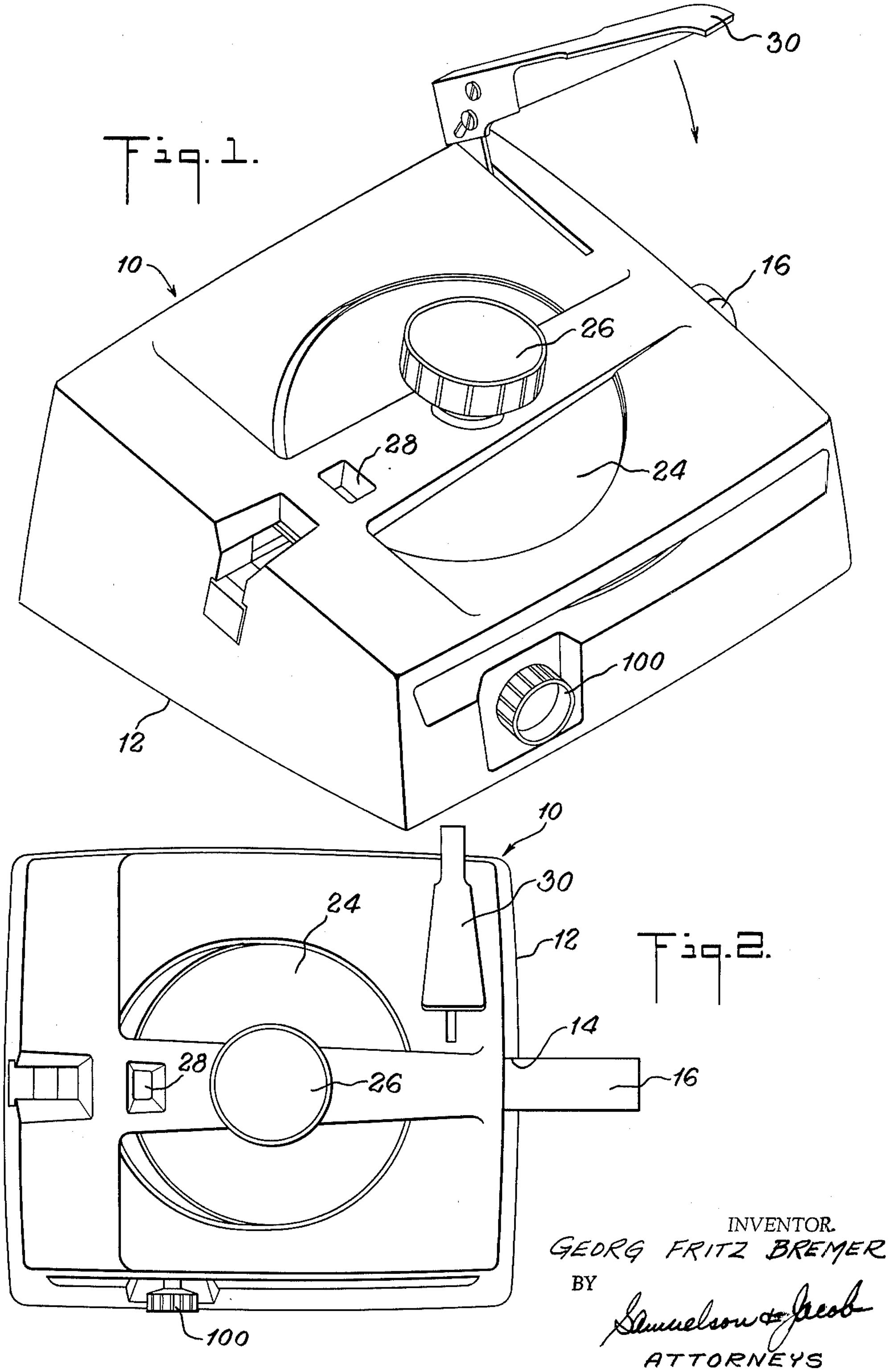
FIGURE 1 is a perspective view of a desk top embossing machine constructed in accordance with the invention.
FIGURE 2 is a top plan view of the embossing machine.

Referring to the drawings, an embossing machine constructed in accordance with the invention is generally designated at 10 in FIGURES 1 and 2. Embossing machine 10 is designed for providing embossments in an elongated strip of embossable material and is constructed constructed for desk top use. The machine has a housing 12 which acts as a support for the machine on a desk and which is provided at one end thereof with means, preferably in the form of socket 14, for receiving a supply of the strip material which is generally provided in a tape magazine 16 capable of being located and secured in the socket 14.

Figures 3, 4:
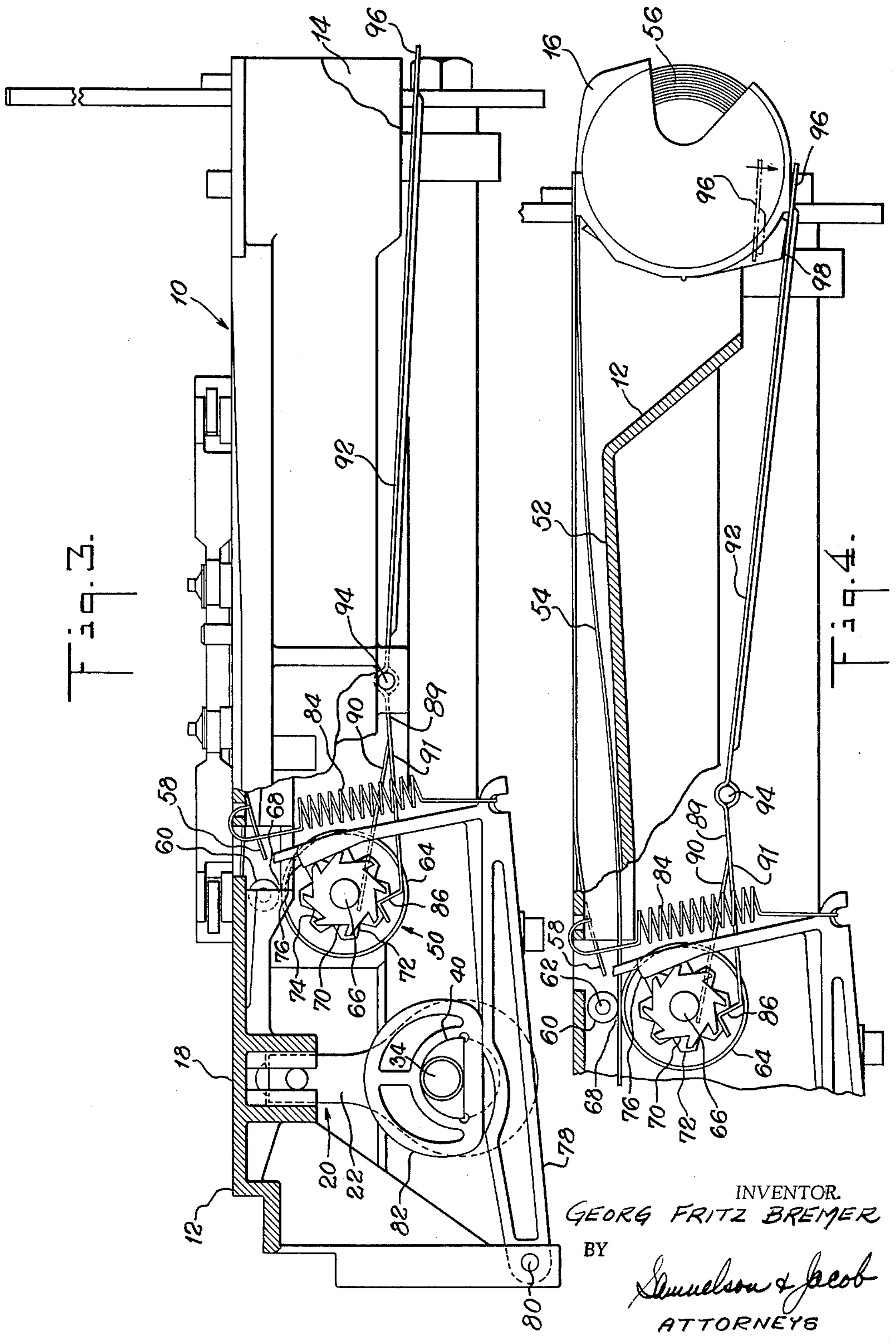
FIGURE 3 is an elevational cross-sectional view of the embossing machine without a tape magazine therein.
FIGURE 4 is a fragmentary elevational cross-sectional view illustrating the machine with a tape magazine in place therein.
Figure 5:
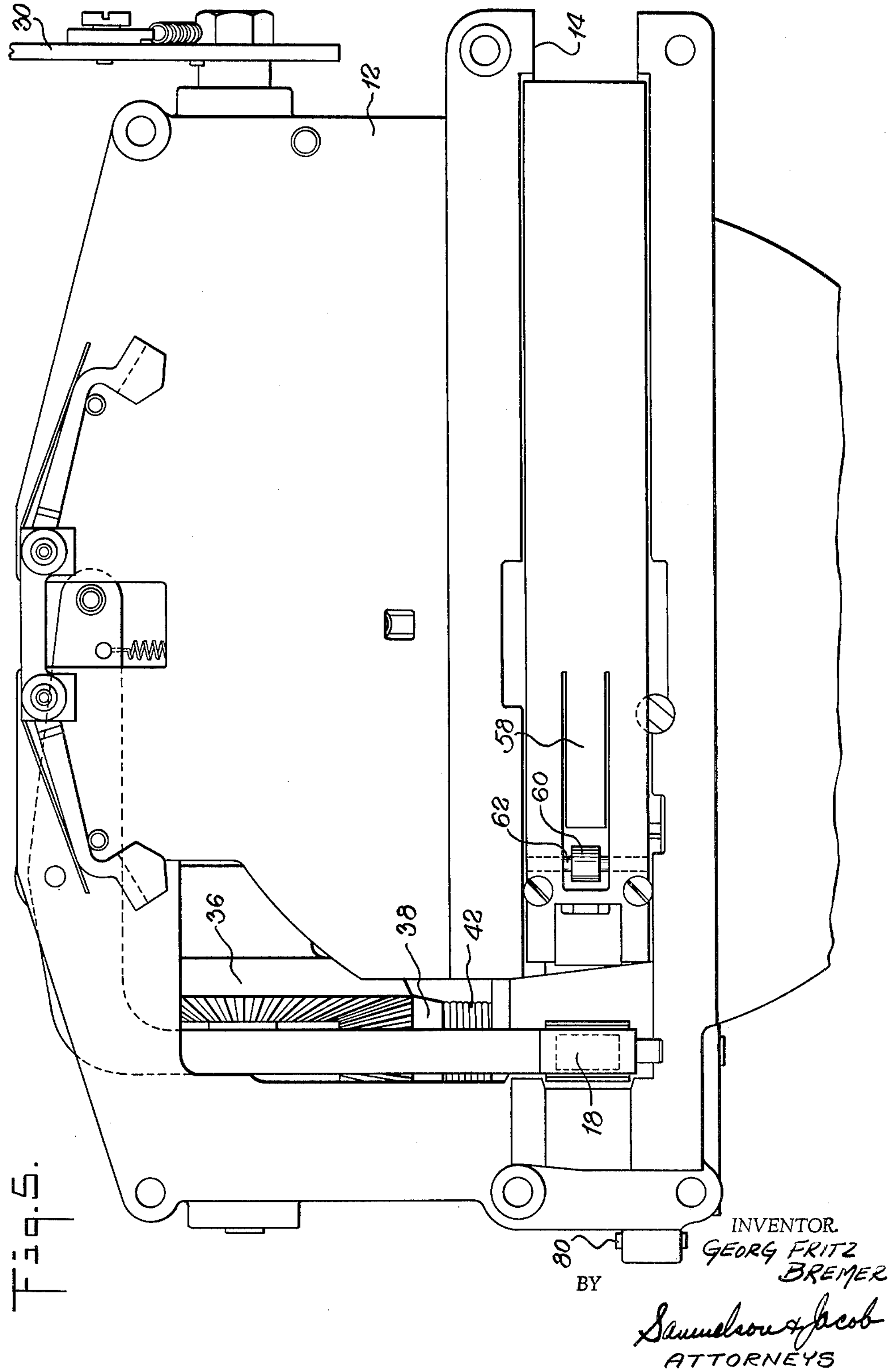
FIGURE 5 is a top plan view of a portion of the machine showing some internal details.
Figure 5:
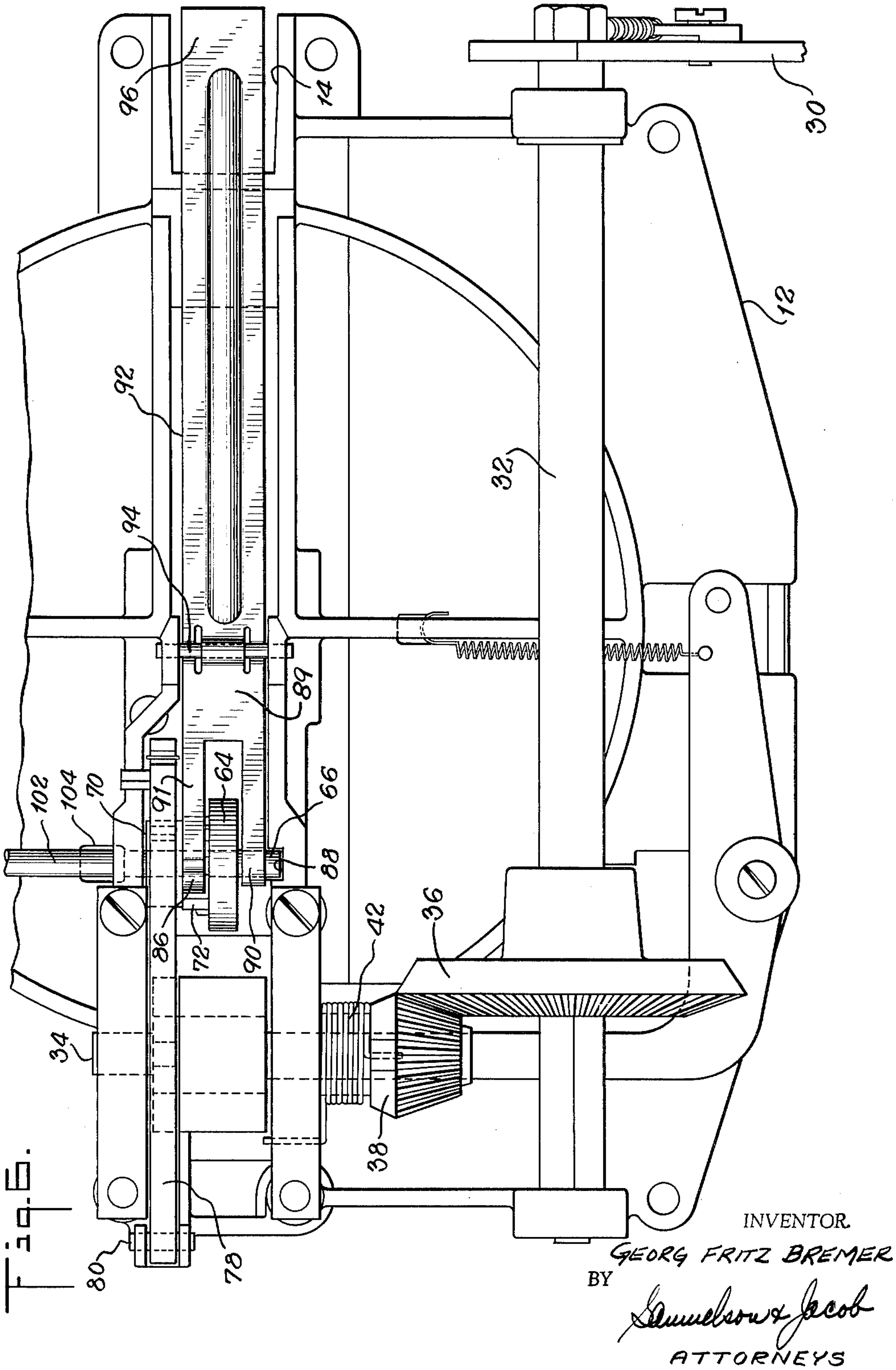

As seen in FIGURE 3, mounted in the housing at an embossing station 18 adjacent the other end thereof is strip embossing means 20 including a reciprocating member 22 which ordinarily actuates a die set in disk 24 to establish an embossment in the strip of embossable material. Disk 24 includes a plurality of die sets adjacent its periphery and is mounted upon the top of the housing for rotation by selector knob 26 to selectively present different die sets at the strip embossing station. Ordinarily, the disk is lettered with characters corresponding to the various indicia provided by the die sets so that when a particular die set is positioned at the embossing station, a corresponding character may be viewed through selector window 28. An actuating handle 30 is operatively connected to embossing means 20 through shafts 32 and 34 and bevel gears 36 and 38 mounted thereon (see FIGURES 5 and 6) such that upon movement of handle 30 downwardly, in the direction of the arrow in FIGURE 1, shafts 32 and 34 will rotate and eccentric 40 will drive reciprocating member 22 upwardly into engagement with the selected die set. A helical spring 42 is arranged for returning the handle 30 to the original position shown in FIGURE 1 at the end of each operating stroke.

Between the socket 14 and the embossing means 20 is a feed means 50 mounted in the housing for feeding the strip of embossable material from the supply magazine 16 to the embossing station 18. As seen in FIGURE 4, the housing is provided with a longitudinal guide channel 52 which guides an elongated strip, or tape 54 from the coil supply 56 in the magazine 16 toward the feed means 50 which intercepts the path of travel of the tape as defined by guide channel 52 and a guide finger 58. Feed means 50 is made up of a first roll 60 journaled for rotation about a first axis by means of axle 62 fixed in housing 12 and a second roll 64 journaled for rotation about a second axis by means of axle 66. The surfaces of rolls 60 and 64 define a nip 68 for receiving the tape 54 and gripping the tape so that upon rotation of the rolls, the tape will be advanced. In the illustrated embodiment of the invention, roll 60 is an idler roll while roll 64 is driven in step-by-step fashion in order to feed the tape in predetermined increments. In order to achieve incremental advancement of tape 54, integral juxtaposed ratchet wheels 70 and 72 are associated with roll 64. Ratchet wheel 70 is provided with teeth 74 engageable by pawl 76 as will now be explained. Pawl 76 is integral with arm 78 which, in turn, is pivotally mounted to the housing 12 by pin 80. Arm 78 is movable downwardly, as seen in FIGURE 3, in response to rotation of an eccentric 82 which is operatively connected to shaft 34. Such downward movement of arm 78 will bring pawl 76 into engagement with a tooth 74 of ratchet wheel 70. Upon continued rotation of eccentric 82 back to the position shown in FIGURE 3, spring 84 will move arm 78 and pawl 76 upwardly to rotate ratchet wheel 70 and roll 64 counterclockwise through a predetermined angle which determines the increment through which tape 54 will be advanced. The increment is accurately defined through the cooperation of spring detent 86 with the ratchet wheel 72 which allows indexing of the roll 64 through predetermined increments and additionally serves to preclude clockwise rotation of roll 64 as the pawl 76 moves downwardly. Thus, upon completion of an embossing operation at station 18, actuating handle 30 is allowed to return to the normally uppermost position and tape 54 is advanced a predetermined increment to prepare the strip material for another embossment to be established at station 18.

Because the tape 54 must be advanced through accurate increments, the gripping force exerted upon the tape at nip 68 must be great enough to preclude relative movement between the surface of roll 64 and the tape through slipping of the tape in the nip. However, it has been found convenient to allow such slipping upon threading of the tape between the feed rolls when initially inserting a new supply of tape in the machine. Additionally, it is sometimes desirable to remove an existing tape supply from the machine, such as when a change of tape color is required, and slipping of the tape from between the feed rolls becomes a convenience in such changes.

Figure 7:
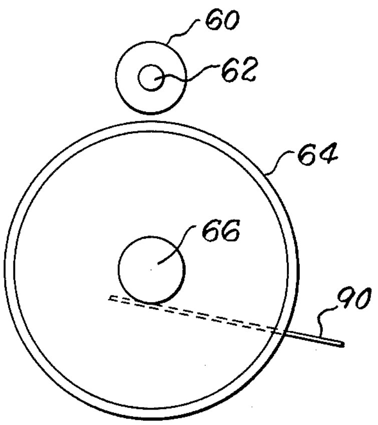
FIGURES 7 through 9 are diagrammatic views illustrating the operation of elements of the feed mechanism of the machine.
Figure 8:
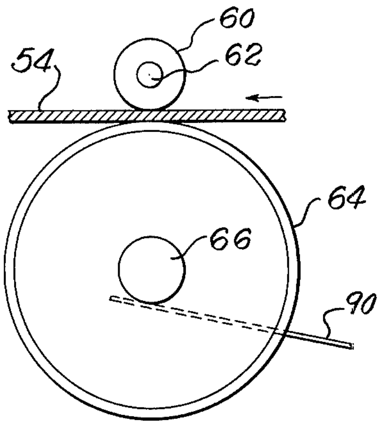
Figure 9:
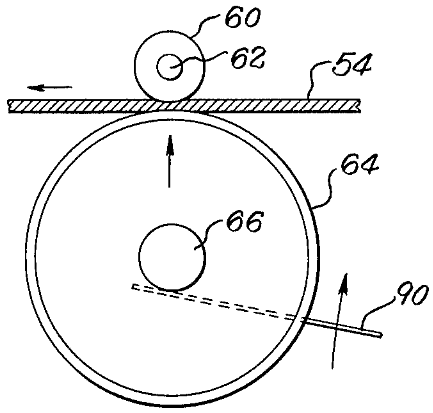

In order to accommodate the need for passing of the tape through nip 68 either with or without gripping of the tape between the surfaces of the rolls, axle 66 is laterally movable relative to axle 62 so that the axis of rotation of roll 64 may be displaced relative to the axis of rotation of roll 60, axle 66 being movable between a first position (see FIGURES 4 and 9) wherein roll 64 is in such proximity with roll 60 as to enable tape 54 to be gripped between the surfaces of the rolls and to be advanced by rotation of roll 64 as described above and a second position (see FIGURES 3, 7 and 8) wherein roll 64 is displaced from roll 60 a distance sufficient to permit passage of the tape between the surfaces of the rolls without gripping of the tape. Such lateral displacement of roll 64 relative to roll 60 is allowed to take place by virtue of axle 66 being supported in slot 88 (FIGURE 6) which extends in a direction permitting such movement. Since it is desirable to maintain the number of operating controls at a minimum and since in embossing machine 10 the tape is supplied from a magazine 16, the displacement of roll 64 relative to roll 60 is conveniently made responsive to the presence and absence of a magazine 16 in socket 14. Thus, tape 54 may be threaded through the feed means 50 without resistance as a magazine is being placed within the socket and once the magazine is properly located within the socket, the feed rolls will grip the tape for feeding in synchronization with the embossing operations. Likewise, upon removal of a magazine from the socket, tape 54 may be retracted from the feed means without resistance and without the need for operating any further controls. Additionally, the arrangement whereby the gripping of the feed rolls is responsive to the presence of a magazine in proper position in the socket assures that machine 10 cannot be operated until magazine 16 is properly positioned in socket 14 and precludes faulty performance which might result from poor registry of the magazine and tape in the machine.

The displacement of roll 64 relative to roll 60 in response to the presence or absence of a magazine 16 in socket 14 is accomplished as follows: roll 64 is normally biased toward the first position by a leaf spring 89 which is divided into a first leg 90 and a second leg 91. The first leg 90 engages axle 66 and the second leg 91 engages ratchet wheel 72 at 86 so that the bifurcated leaf spring 89 supports the assembly comprising the feed roll 64, axle 66 and associated ratchet wheels 70 and 72 and exerts an upwardly directed (FIGURE 3) biasing force upon the assembly. The leaf spring 89 is an integral part of a lever 92 which is pivotally mounted for rotation about pin 94 which is fixed in housing 12. Lever 92 extends longitudinally so as to project end 96 thereof into the vicinity of socket 16. When no magazine is present in socket 14, lever 92 may readily be rotated in a counterclockwise direction to allow roll 64 to be moved into the second position (FIGURE 8) and tape 54 may be passed between the feed rolls without resistance. In this instance, the biasing force exerted by leaf spring 89 is not great enough to cause tape 54 to be gripped between the feed rolls 60 and 64. Upon proper location of magazine 16 within socket 14, end 96 of lever 92 is contacted by a cam surface 98 provided on the magazine 16 and moved downwardly, as illustrated in FIGURE 4, to rotate the lever in a clockwise direction. Such rotation increases the biasing force exerted upon the assembly by leaf spring 89 which, in turn, moves roll 64 into the first position (see FIGURE 9), where the surfaces of the feed rolls will grip tape 54, and maintains the roll 64 in that position.

Tape 54 may be advanced by the feed mechanism 50 independent of the actuation of handle 30 by turning knob 100 which is operatively connected to axle 66 through shaft 102 by means of a flexible coupling 104.

It is understood that the above detailed description of an embodiment of the invention is presented by way of example only. Modifications in certain details of design and construction may be accomplished without departing from the true spirit and scope of the invention as defined in the appended claims.

What is claimed is:

1. An embossing machine comprising:

a housing;

embossing means carried by the housing for establishing embossments on a strip of embossable material;

means in said housing for receiving a magazine containing a supply of the embossable material and for maintaining the magazine in such cooperative relationship with the housing as to allow the material to be fed from the supply to the embossing means;

feed means carried by said housing for gripping and feeding the strip from the supply to the embossing means; and means responsive to the absence of a magazine from the magazine receiving means for allowing the strip to be passed through said feed means without gripping of the strip by the feed means when no magazine is present in said magazine receiving means and responsive to the presence of a magazine in position in the magazine receiving means for enabling the strip to be gripped and advanced by said feed means.

2. An embossing machine comprising:

a housing;

embossing means carried by the housing for establishing embossments on a strip of embossable material;

means in said housing for receiving a magazine containing a supply of the embossable material and for maintaining the magazine in such cooperative relationship with the housing as to allow the material to be fed from the supply to the embossing means;

feed means carried by the housing for feeding a strip of said material from said supply to said embossing means, said feed means including a pair of rolls journaled for rotation in such proximity to one another as to enable the material to be gripped between the rolls and to be advanced by rotation of the rolls;

means for allowing relative lateral movement between said rolls to permit passage of the material between the rolls without gripping thereof upon displacement of one roll laterally away from the other roll; and means responsive to the presence and absence of a magazine in said magazine receiving means for maintaining the rolls in said proximity when the magazine is located in said magazine receiving means and for permitting said lateral displacement when no magazine is present in said magazine receiving means.

3. An embossing machine comprising:

a housing;

embossing means carried by the housing for establishing embossments in a strip of embossable material;

a socket in said housing for receiving and securing a magazine containing a supply of the embossable material and for maintaining the magazine in such cooperative relationship with the housing as to allow the material to be fed from the supply to the embossing means;

feed means for feeding a strip of said material from said supply to said embossing means, said feed means including a first roll journaled in said housing for rotation about a fixed axis and a second roll journaled for rotation about an axis parallel to said fixed axis and movable laterally with respect thereto between a first position wherein said second roll is in such proximity to the first roll as to enable the strip of material to be gripped between the rolls and to be advanced by rotation of the rolls and a second position wherein said second roll is displaced from said first roll a distance sufficient to permit passage of said strip between the rolls without gripping of the material;

means for biasing the movable axis toward said first position while allowing lateral displacement toward the second position; and means for increasing and decreasing the biasing force exerted by said biasing means in response to the presence and absence, respectively, of a magazine in the socket such that in the absence of a magazine the second roll axis is movable to said second position and upon location of a magazine in proper position in the socket the second roll axis is maintained at said first position.

4. An embossing machine of claim 3 wherein said feed means includes means for driving said second roll to advance said strip.

5. An embossing machine comprising:

a housing;

means for guiding a strip of embossable material generally longitudinally through the housing;

embossing means carried by the housing for establishing embossments on the strip;

means in the housing for receiving and securing a magazine containing a supply of the embossable material and for maintaining the magazine in such cooperative relationship with the housing as to allow the material to be fed from the supply to the embossing means;

feed means carried by the housing for feeding the strip from the supply to the embossing means, said feed means including a pair of rolls journaled for rotation about generally laterally spaced first and second axes transverse to the direction of feed, the first axis being fixed and the second axis being laterally movable toward and away from the fixed axis between a first position wherein the proximity of the rolls enables the strip to be gripped between the rolls and to be advanced by rotation of the rolls and a second position wherein the rolls are laterally displaced from one another to allow passage of the material between the rolls without gripping of the strip;

spring means for biasing the second axis toward the first position with a force which permits movement of the second axis into the second position in the absence of a magazine in the magazine receiving means; and means cooperatively engaging the spring means for increasing the biasing force exerted by said spring means in response to the presence of a magazine in the magazine receiving means to maintain the second axis in the first position when a magazine is properly positioned in the magazine receiving means.

6. An embossing machine comprising:

a housing;

means for guiding a strip of embossable material generally longitudinally through the housing;

embossing means carried by the housing for establishing embossments on the strip;

a socket in the housing for receiving and securing a magazine containing a supply of the embossable material and for maintaining the magazine in such cooperative relationship with the housing as to allow the material to be fed from the supply to the embossing means;

feed means for feeding the strip from the supply to the embossing means, said feed means including a first roll journaled in said housing for rotation about a fixed axis transverse to the longitudinal direction of feed and a second roll journaled for rotation about an axis parallel to said fixed axis and movable laterally with respect thereto between a first position wherein the second roll is in such proximity to the first roll as to enable the strip to be gripped by the rolls and to be advanced by rotation of the rolls and a second position wherein the second roll is vertically displaced from the first roll a distance sufficient to permit passage of said strip between the rolls without gripping of the strip;

a spring cooperatively related to the second roll for biasing the second roll axis toward the first position with a force which permits movement of the second roll axis into the second position in the absence of a magazine in the socket; and a lever mounted in the housing for pivotal movement about an axis generally parallel to the fixed and movable axes and having a first portion cooperating with the spring and a second portion projecting toward the socket such that upon proper location of a magazine in the socket, the lever is moved by the magazine to increase the biasing force exerted by the spring and maintain the second roll axis in the first position.

7. An embossing machine of claim 6 wherein said spring is a leaf spring integral with the lever.

8. An embossing machine of claim 7 wherein said feed means includes means for driving said second roll to advance said strip.

References Cited by the Examiner

UNITED STATES PATENTS

| | | | |
|---|---|---|---|
| 964,251 | 7/1910 | Hartog | 197—6.7 |
| 1,146,571 | 7/1915 | Huizenga | 197—6.7 |
| 2,071,076 | 2/1937 | La Borde et al. | 226—34 |
| 2,979,179 | 4/1961 | Anglim et al. | 197—6.7 |
| 3,203,528 | 8/1965 | Bogeaus | 197—6.7 XR |

ROBERT E. PULFREY, *Primary Examiner.*

EDGAR S. BURR, *Assistant Examiner.*